No. 743,745. PATENTED NOV. 10, 1903.
J. F. McELROY.
VALVE.
APPLICATION FILED JUNE 18, 1902.
NO MODEL.
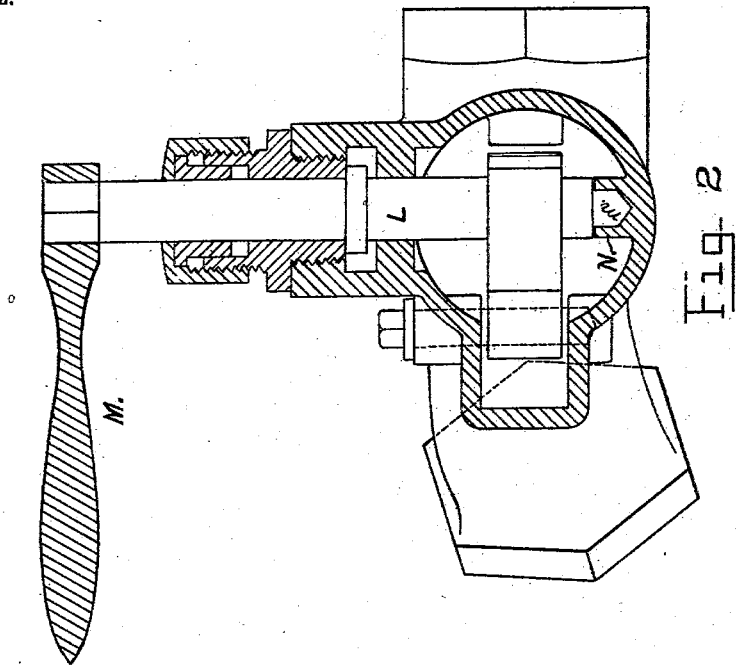
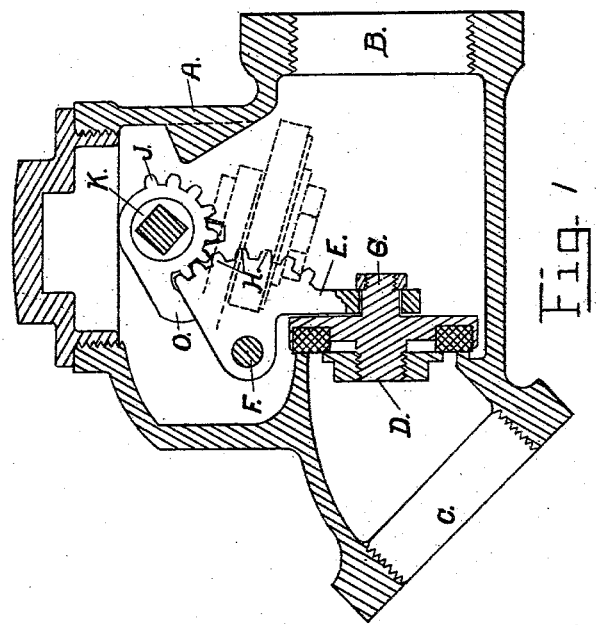

No. 743,745. Patented November 10, 1903.

UNITED STATES PATENT OFFICE.

JAMES F. McELROY, OF ALBANY, NEW YORK, ASSIGNOR TO CONSOLIDATED CAR-HEATING COMPANY, OF ALBANY, NEW YORK.

VALVE.

SPECIFICATION forming part of Letters Patent No. 743,745, dated November 10, 1903.

Application filed June 19, 1902. Serial No. 112,292. (No model.)

*To all whom it may concern:*

Be it known that I, JAMES F. McELROY, a citizen of the United States of America, and a resident of Albany, county of Albany, and State of New York, have invented certain new and useful Improvements in Valves, of which the following is a specification.

My invention relates to improvements in valves; and the object of my invention is to provide a gear-valve especially adapted for use as an end valve in railway-car-heating apparatus, so constructed that the valve may be opened by the operation of a crank or handle and when opened or closed will remain in its position in spite of the jar attendant upon the movement of the car to which it is attached. I attain this object by means of the mechanism illustrated in the accompanying drawings, in which—

Figure 1 is a section of an end valve, showing in elevation the gear and means for operating the valve. Fig. 2 is a section of an end valve, showing a plan of my improved operating device.

Similar letters refer to similar parts throughout the several views.

The fitting A is provided with a port B, adapted to connect with a train-pipe, (not shown,) and with a port C, adapted to connect with a hose to conduct the fluid to the adjoining car, said hose not shown. The valve D is arranged to close the port C and is suitably hinged to the casting, preferably by means of a lever E, pivoted at F, one arm of the lever being secured to the face of the valve by means of a lug and nut, as shown at G, or in any suitable manner, and the arm E is also provided with a series of teeth H, arranged in an arc of the circle of which the pivot F is the center, adapted to engage with the teeth J on the pinion K, which pinion is constructed or mounted upon a spindle L, passing through the fitting A and having its outer end squared to admit a handle M being placed thereon. The end of the spindle which is placed within the fitting is preferably provided with a projection $m$, fitting within a pocket N, forming a bearing therein.

I do not limit myself to the arrangement of the spindle with its squared end as described, since the handle may be fastened in any suitable manner to the end of the spindle in any convenient way, nor do I wish to limit myself to the form of my construction of the spindle as described or the method of connecting it up.

I preferably arrange on the pinion K the stop-arm O, which will press against the side or end of the lever E when the valve is closed and will hold it in position, relieving pressure on the pinion. The handle M is preferably weighted and is so adjusted on the spindle L that when the valve is opened, as shown in dotted lines in Fig. 1, the handle will be beyond the vertical position, the weight of the handle tending to hold the valve in its opened position, and when the valve is closed the handle will be on the opposite side of the vertical line from that occupied by it when the valve is open, and thus tend to hold the valve closed.

What I claim as my invention, and desire to secure by Letters Patent, is—

A fitting provided with ports, a valve arranged to close one of said ports, a lever provided with a gear connected with said valve and suitably pivoted to the fitting, a pinion arranged to mesh with said gear, a stop-arm on said pinion, a means for operating said pinion, substantially as described.

Signed at Albany this 16th day of June, 1902.

JAMES F. McELROY.

Witnesses:
ERNEST D. JANSEN,
BEULAH CARLE.